United States Patent
Suemori et al.

(10) Patent No.: US 6,190,583 B1
(45) Date of Patent: Feb. 20, 2001

(54) APPARATUS AND METHOD FOR MAKING SLOTTED ROD FOR OPTICAL CABLE

(75) Inventors: Shigeru Suemori; Takehiko Okada; Shigeki Yasui, all of Yokohama (JP)

(73) Assignee: Sumitomo Electric Industries Ltd., Osaka (JP)

( * ) Notice: Under 35 U.S.C. 154(b), the term of this patent shall be extended for 0 days.

(21) Appl. No.: 09/157,943

(22) Filed: Sep. 22, 1998

(30) Foreign Application Priority Data

Sep. 22, 1997 (JP) .................................... 9-256910

(51) Int. Cl.$^7$ ............................... B29D 11/00; G02B 6/44
(52) U.S. Cl. .................... 264/1.29; 264/171.13; 264/177.17; 264/211.12
(58) Field of Search .................. 264/1.1, 1.24, 264/1.28, 1.29, 171.13, 177.17, 211.12; 425/113, 114

(56) References Cited

U.S. PATENT DOCUMENTS

| | | | |
|---|---|---|---|
| 4,205,899 | * 6/1980 | King et al. | 264/1.29 |
| 4,474,426 | * 10/1984 | Yataki . | |
| 4,548,567 | * 10/1985 | Missout | 425/113 |
| 4,673,540 | * 6/1987 | Portinari | 264/1.29 |
| 4,757,675 | 7/1988 | Oglesby et al. | 57/6 |
| 4,872,824 | 10/1989 | Williams et al. | 425/113 |
| 5,380,472 | * 1/1995 | Schneider | 264/1.29 |

FOREIGN PATENT DOCUMENTS

| | | |
|---|---|---|
| 2 186 520 | 8/1987 | (GB) . |
| 63-264714 | 11/1988 | (JP) . |
| 1-303408 | 12/1989 | (JP) . |
| 3-110509 | 5/1991 | (JP) . |

OTHER PUBLICATIONS

Patent Abstracts of Japan vol. 018, No. 321 (P–1756), Jun. 17, 1994 & JP 06 075147 A (Fujikura Ltd), Mar. 18, 1994.

* cited by examiner

Primary Examiner—Mathieu D. Vargot
(74) Attorney, Agent, or Firm—Pillsbury Winthrop LLP

(57) ABSTRACT

The present invention relates to an apparatus and method for making a slotted rod for an optical cable, which improves manufacturing efficiency, while alleviating the load applied to the apparatus. In the present invention, a rotatable die for forming a slot in a resin surface covering a tension member is rotated about the moving direction of the tension member such that the rotatable die alternately reverses its rotational direction for every predetermined reverse pitch of the tension member, and the tension member is alternately twisted in rotational directions opposite to the rotational directions of the rotatable die in synchronization with the rotation of the rotatable die.

3 Claims, 10 Drawing Sheets

APPARATUS AND METHOD FOR MAKING SLOTTED ROD FOR OPTICAL CABLE

BACKGROUND OF THE INVENTION

1. Field of the Invention

The present invention relates to an apparatus and method for making a slotted rod which is accommodated in an optical cable and protects a plurality of optical fibers.

2. Related Background Art

Figure 1:
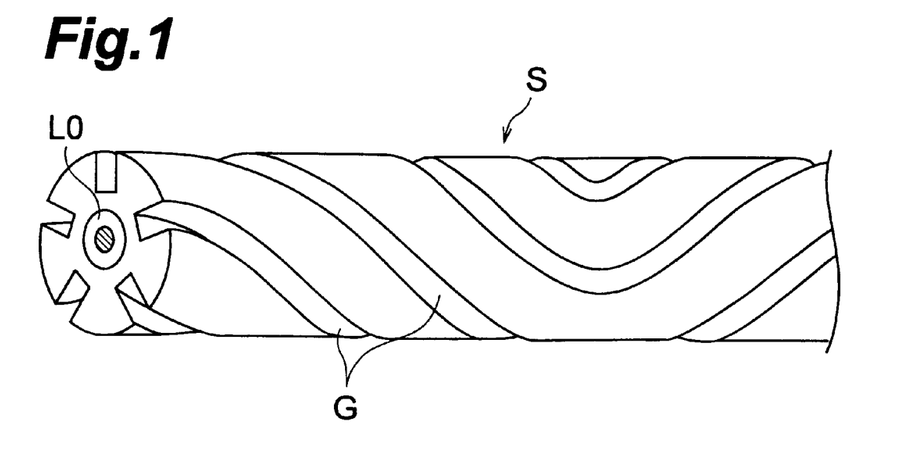
FIG. 1 is a perspective view showing a slotted rod for an optical cable, which has a tension member at the center thereof and slots formed in the outer peripheral face thereof.

Employed as a slotted rod for an optical cable is a slotted rod S (spacer) shown in FIG. 1 in which a slot G accommodating an optical fiber is formed to meander as a so-called SZ groove in order to prevent extraordinary tension from being applied to the accommodated optical fiber and improve workability for taking out the optical fiber for branching. In general, such a slotted rod S is manufactured in a manner that, while a molten resin is extruded around a tension member L0 by an extruder through its rotatable die, the die is rotated alternately in reverse directions to form the above-mentioned slot G in the outer peripheral face of the resin layer thus extruded.

Figure 2:
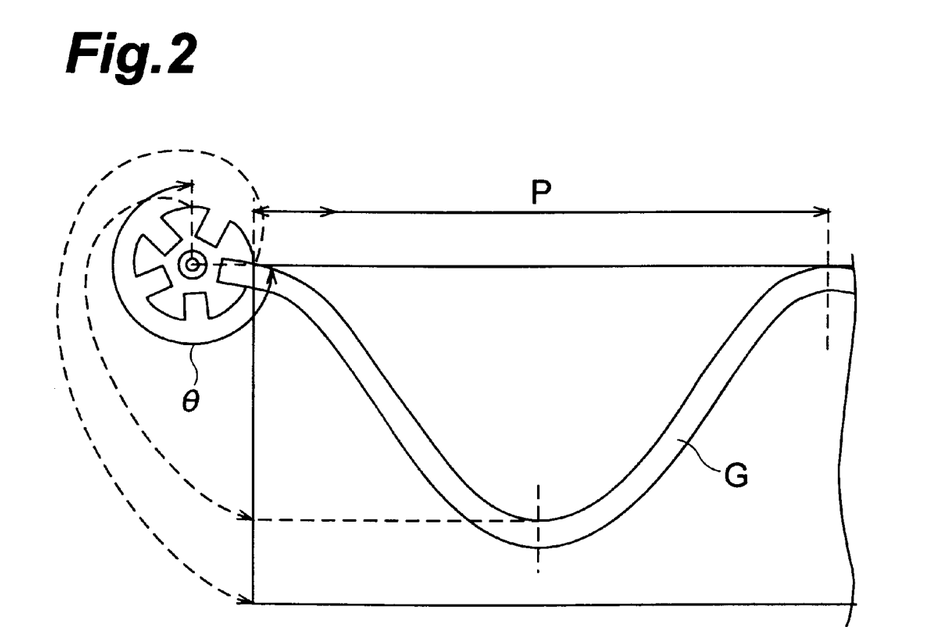
FIG. 2 is a development of the outer peripheral face for explaining the reversing angle of a slot in a slotted rod for an optical cable.

In the above-mentioned method, however, due to the alternate reversing operation of the rotatable die (operation for alternating its rotational direction), the tension member L0 maybe twisted, thereby the reversing angle θ of the slot G in thus molded slotted rod S (the center angle formed on the slotted rod cross-section corresponding to the slot formed in a cycle of reversing rotation of the rotatable die(i.e. a period between any two consecutive reversions of the rotational direction of the die); see FIG. 2) may become smaller than the rotational angle of the rotatable die (the angle formed by a cycle of reversing rotation of the rotatable die). Consequently, in order for the slot G to attain a desired reversing angle, the rotatable die must have a large rotational angle, thus making it difficult to improve the manufacturing speed that depends on the speed of the alternate reversing operation. Here, in FIG. 2, P is a pitch for a cycle of reversing rotation of the rotatable die and corresponds to the distance which the tension member L0 passes during such a single cycle (hereinafter referred to as a 'reversing pitch').

Known as the manufacturing apparatus having a rotatable die which alternately reverses its rotational direction are those disclosed in Japanese Patent Application Laid-Open No. 3-110509 and No. 1-303408. Japanese Patent Application Laid-Open No. 3-110509 discloses a manufacturing apparatus in which, for restraining the tension member from being twisted, the tension member is grasped upstream the rotatable die. Japanese Patent Application Laid-Open No. 1-303408 discloses a manufacturing apparatus in which, in the state where the tension member is grasped upstream the rotatable die, the grasping unit is synchronized with the reversing operation of the rotatable die such as to twist the tension member in the same direction as the rotation of the rotatable die.

SUMMARY OF THE INVENTION

It is an object of the present invention to provide an apparatus and method for making a slotted rod for an optical cable, which can lower the rotational angle of the rotatable die so as to improve manufacturing efficiency, while alleviating the load applied to the manufacturing apparatus.

The present invention relates to an apparatus and method for making a slotted rod for an optical cable. This slotted rod is constituted by a tension member placed at a center thereof and a resin layer disposed around the tension member, and a surface of the resin layer is formed with at least one slot in which a plurality of optical fibers are collectively accommodated.

For making the above-mentioned slotted rod for an optical cable, the apparatus according to the present invention comprises, at least, a grasping unit for grasping a tension member; and an extruder having a head portion with a space through which the tension member paid out from the grasping unit penetrates and, while injecting a molten resin into the head portion, extruding the resin coating around the tension member from a resin extruding orifice of the head portion. Arranged at the resin extruding orifice of the head portion is a rotatable die having a through hole for passing the tension member therethrough and a plurality of protrusions for forming the slots in the resin surface surrounding the tension member. While the resin is extruded around the tension member, the rotatable die is rotated about the pay-out direction of the tension member as its axis, alternately reversing its rotary direction at every reversing pitch of the tension member, thereby to form a slotted rod having measuring slots such as shown in FIG. 1.

The apparatus according to the present invention further comprises a first driving system for rotating the grasping unit about the pay-out direction of the tension member as its axis as to twist the tension member by a predetermined amount, and a second driving system for rotating, about the pay-out direction of the tension member, the rotatable die disposed at the resin extruding orifice of the head portion. The first and second driving systems are driven and controlled by a controller electrically connected thereto. Specifically, the controller controls the second driving system such that the rotational direction of the rotatable die is alternately reversed in every predetermined pitch of the tension member, and controls the first driving system such that the tension member is alternately twisted in rotational directions opposite to the rotational directions of the rotatable die in synchronization with the rotation of the rotatable die. According to such a driving and controlling operation, the rotatable die and the grasping unit are always rotated in directions opposite to each other.

In other words, in the manufacturing method according to the present invention employing the apparatus configured as mentioned above, while the above-mentioned tension member is introduced into the extruder, the resin is extruded from the head portion to cover the tension member, the rotatable die is rotated about the moving direction of the tension member such that the rotatable die alternately reverses its rotational direction for every predetermined reversing pitch of the tension member, and the tension member is alternately twisted in rotational directions opposite to that of the rotatable die in synchronization with the rotation of the rotatable die. The grasping unit is disposed so as to apply an external force to twist the tension member that is introduced into the orifice of the head portion.

In accordance with the present invention, since the rotating operation of the grasping unit is made opposite to the rotating operation of the rotatable die, the rotational angle of the rotatable die can be made sufficiently small. As a result, even when the linear manufacturing speed is increased, the rotatable die can fully follow it, thus allowing the manufacturing efficiency to improve due to the higher linear speed. Also, since the driving load for the rotatable die can be alleviated, the apparatus can be made smaller and less expensive.

Since the rotational angle of the rotatable die is small, the shearing stress applied to the resin at the time of extrusion can be made small. As a result, the surface of thus made slotted rod (bottom part of the slot in particular) can be made smoother. When the surface roughness is high, irregularities in the surface are likely to apply stress to the optical fiber, thereby yielding a possibility of transmission characteristics being affected. Further, the mechanism for alternately rotating the grasping unit can have a configuration simpler than that of the mechanism for rotating the rotatable die incorporated in a complicated extruding mechanism, whereby a higher production efficiency can be easily realized.

Preferably, the rotational angle of the grasping unit (i.e. a rotational angle formed by the rotation of the grasping unit between any two consecutive reversions of its rotation) is set such that the rotational angle of the rotatable die and the reversing angle of the slot in the molded slotted rod equal each other. In this case, at the position where the rotatable die is placed, i.e., at the resin extruding orifice of the head portion for effecting extrusion such as to form the slots in the outer periphery of the tension member, substantially no twist is generated in the tension member being extruded, thereby a slotted rod can be manufactured under a stable manufacturing condition. Manufacture under the stable manufacturing condition is an important point from the viewpoint of improving the manufacturing efficiency due to higher linear speed, thereby an improved quality can be expected in the molded slotted rod.

Further, it is preferred that the rotational angle of the grasping unit be set greater than the rotational angle of the rotatable die rotating in the opposite direction. In this case, the rotational angle of the rotatable die can be made smaller, thus making it possible to attain a higher linear speed. Though the rotatable die placed within a complicated extruding mechanism has a larger inertia as a rotating member, the grasping unit realized with a simple configuration has a smaller inertia as a rotating member. Hence, the rotational angle of the rotatable die having a large inertia is made small so as to improve its high-speed trackability, while correspondingly increasing the rotational angle of the grasping unit having a small inertia. Since the grasping unit has a small inertia, it can be caused to fully follow the higher linear speed even when its rotational angle is made large. In the head portion in which the rotatable die is alternately rotated in reverse directions, at its resin extruding orifice in particular, the shearing stress applied to the extruded resin can be alleviated, thereby allowing the surface of thus manufactured slotted rod to become smoother.

The apparatus according to the present invention may further comprise an angle measuring apparatus electrically connected to the controller. The angle measuring apparatus measures the reversing angle of slots formed on the resin surface covering the tension member, preferably after it has been cooled, according to a deviation between the positions of the slots formed at a reversion of the rotational direction of the rotatable die and those at the next reversion. The result of measurement from the angle measuring apparatus is fed to the controller, which then controls at least one of the first and second driving systems so as to correct the difference between the rotational angle of the rotatable die and the reversing angle of the formed slot.

Such a configuration can feed back the reversing angle of the slot in the slot rod being actually manufactured to the rotation control of the rotatable die and/or grasping unit, thereby allowing the accuracy in reversing angle of the slot to further improve. The reversing angle of the slot is an important point in terms of the quality of slotted rod. Also, the conditioning of the rotational angle of the rotatable die and/or grasping unit for realizing a desired reversing angle can be automated when carried out in the controller. Automating the conditioning would cut down the manpower and materials for the conditioning, thereby labor and resources can be expected to be saved.

The driving systems in the apparatus according to the present invention may be configured such that the first driving system has a first driving motor for rotating the grasping unit alternately in reverse directions, and that the second driving system has a second driving motor for rotating the rotatable die alternately in the directions opposite to the rotational directions of the first driving system. Here, the controller outputs control signals whose cycles are reverse to each other to the first and second driving motors, respectively, thus rotating the rotatable die and the grasping unit in reverse directions.

Such a configuration can rotate the rotatable die and the grasping unit in directions opposite to each other in a relatively simple structure. Since the rotation of the rotatable die and the rotation of the grasping unit are effected in synchronization with each other, they are different from each other only in their rotational angle and rotational direction. Consequently, if a control signal for driving one of the first and second driving motors is generated, a control signal for the other driving motor can easily be generated therefrom. Namely, when control signals based on the same control signal are fed to the first and second driving motors, the two motors can be controlled the most efficiently.

On the other hand, the driving systems of the apparatus according to the present invention may be configured such that the second driving system has a driving motor for driving the rotatable die and that the first driving system has a transmission mechanism for transmitting a driving force of the driving motor to the grasping unit.

In such a configuration, the rotatable die and the grasping unit are physically connected to a single driving motor, thereby their rotations in reverse directions can completely be synchronized with each other. Here, the rotation of the rotatable die and the rotation of the grasping unit are different from each other only in their rotational angle and rotational direction, while the ratio of their rotational angles is easily changeable with the transmission mechanism. Namely, a single driving motor can generate a driving force for driving one of the rotatable die and grasping unit, and this driving force can easily be utilized for generating a driving force for driving the other by way of the transmission mechanism.

The grasping unit has a structure for restraining the tension member from being twisted due to the rotation of the rotatable die and restraining the tension member from positionally fluctuating in a direction perpendicular to the payout direction of the tension member. Namely, the grasping unit may comprise a first pulley group arranged along the tension member, and a second pulley group arranged along the tension member such as to grasp the tension member together with the first pulley group. Each pulley group has a plurality of pulleys each having a curved face in contact with the tension member.

Preferably, for effectively applying a twist to the tension member, the grasping unit is disposed as closest to the rotatable die as practically possible at a position which is upstream of the head portion.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 6A is a partly fragmentary view showing the configuration of the grasping unit 4 shown in FIG. 5, whereas FIG. 6B is a view showing the configuration of a pulley 41 shown in FIG. 6A;

DESCRIPTION OF THE PREFERRED EMBODIMENTS

In the following, the apparatus and method for making a slotted rod for an optical cable according to the present invention will be explained with reference to FIGS. 3, 4A, 4B, 5, 6A to 8B, and 9 to 13. When necessary, FIGS. 1 and 2 will also be referred to. Among the drawings, constituents identical to each other will be referred to with numerals or letters identical to each other without repeating their overlapping explanations.

Figure 3:
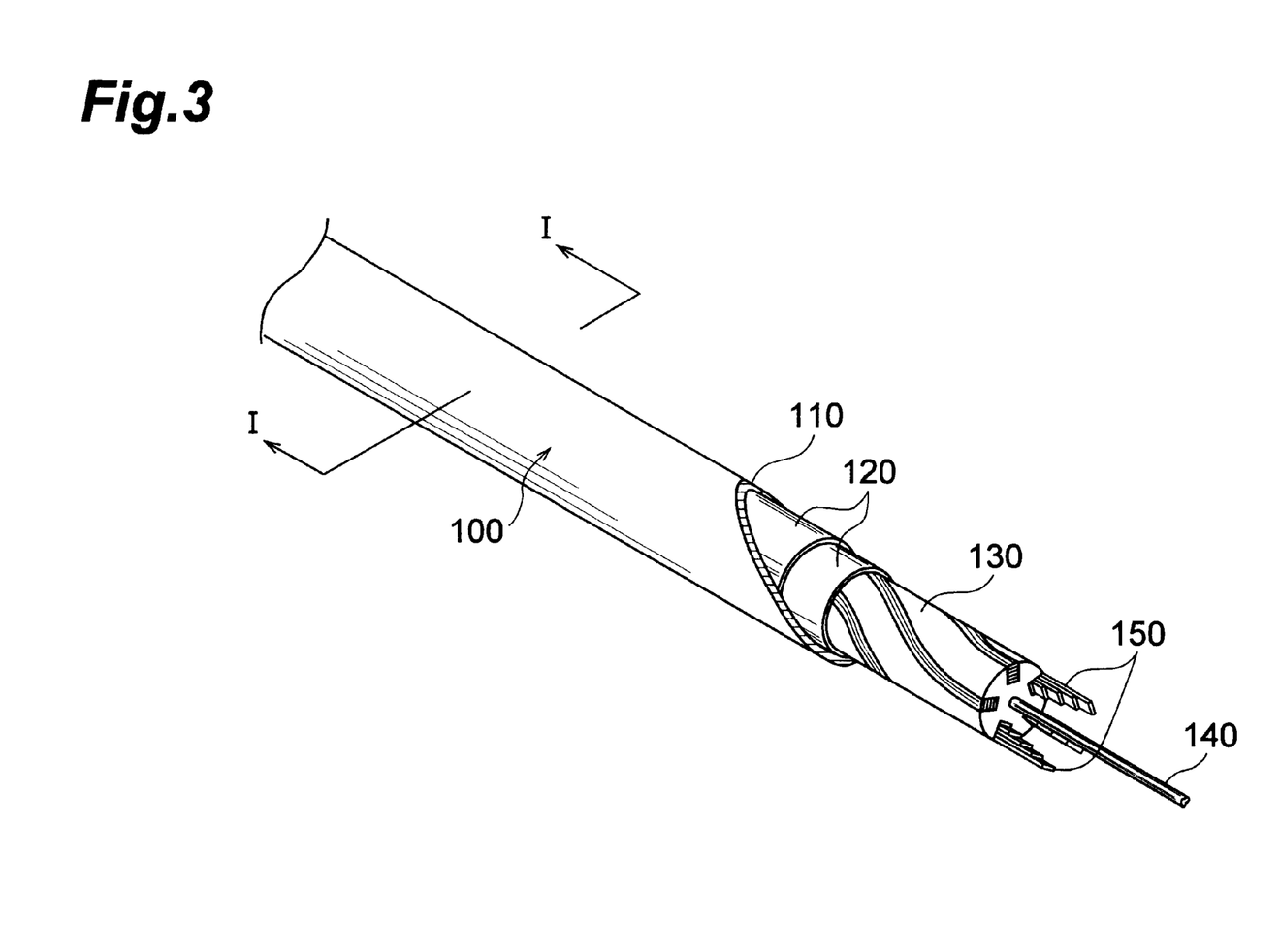
FIG. 3 is a perspective view showing inner configuration of optical cable.
Figure 4A:
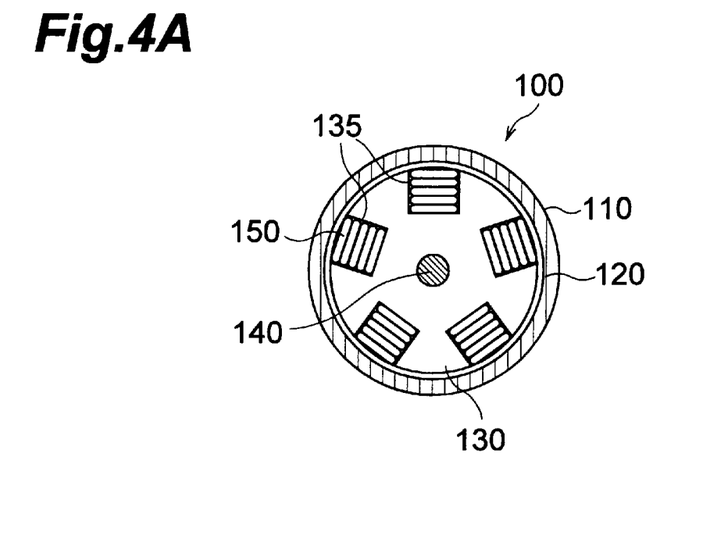
FIGS. 4A and 4B are views showing, respectively, a sectional configuration of the optical cable taken along the line I—I in FIG. 3, and a sectional configuration of optical fibers accommodated in each slot in FIG. 4A.

FIG. 3 is a perspective view showing an inner configuration of an optical cable including 100 optical fibers, whereas FIG. 4A is a view showing a sectional configuration taken along the line I—I in FIG. 3. In this optical cable 100, a slotted rod 130 enveloped in protective films 120 is accommodated in a jacketing 110. The slotted rod 130 is constituted by a tension member 140 disposed at its center, and a resin layer surrounding the tension member 140, whereas a surface of the resin layer is provided with a plurality of slots 135 meandering along the longitudinal direction of the tension member 140. Here, the tension member 140 may be constituted by either a single steel wire or strands of a plurality of steel wires. Each slot 135 accommodates therein an optical fiber group 150.

Figure 4B:
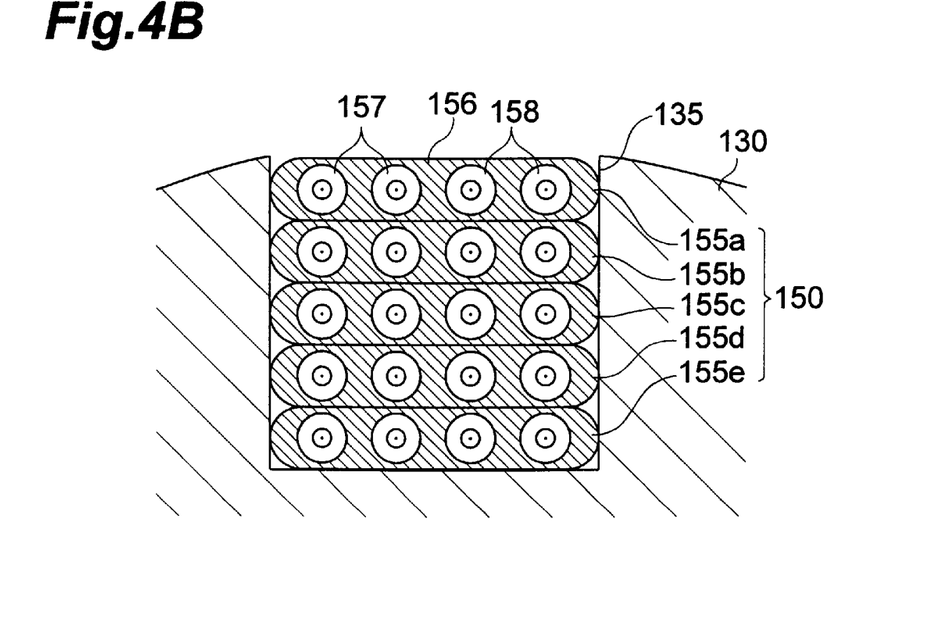

In the optical cable 100, the optical fiber group 150 accommodated in each slot 135 formed in the slotted rod 130 is constituted, as shown in FIG. 4B, by a laminate of optical fiber ribbons 155a to 155e in which a plurality of optical fibers 158 (each composing of a core and a cladding) each covered with a color coat 157 are coated with a resin 156.

An embodiment of the apparatus for making a slotted rod having a configuration such as that mentioned above will now be explained with reference to FIG. 5.

Figure 5:
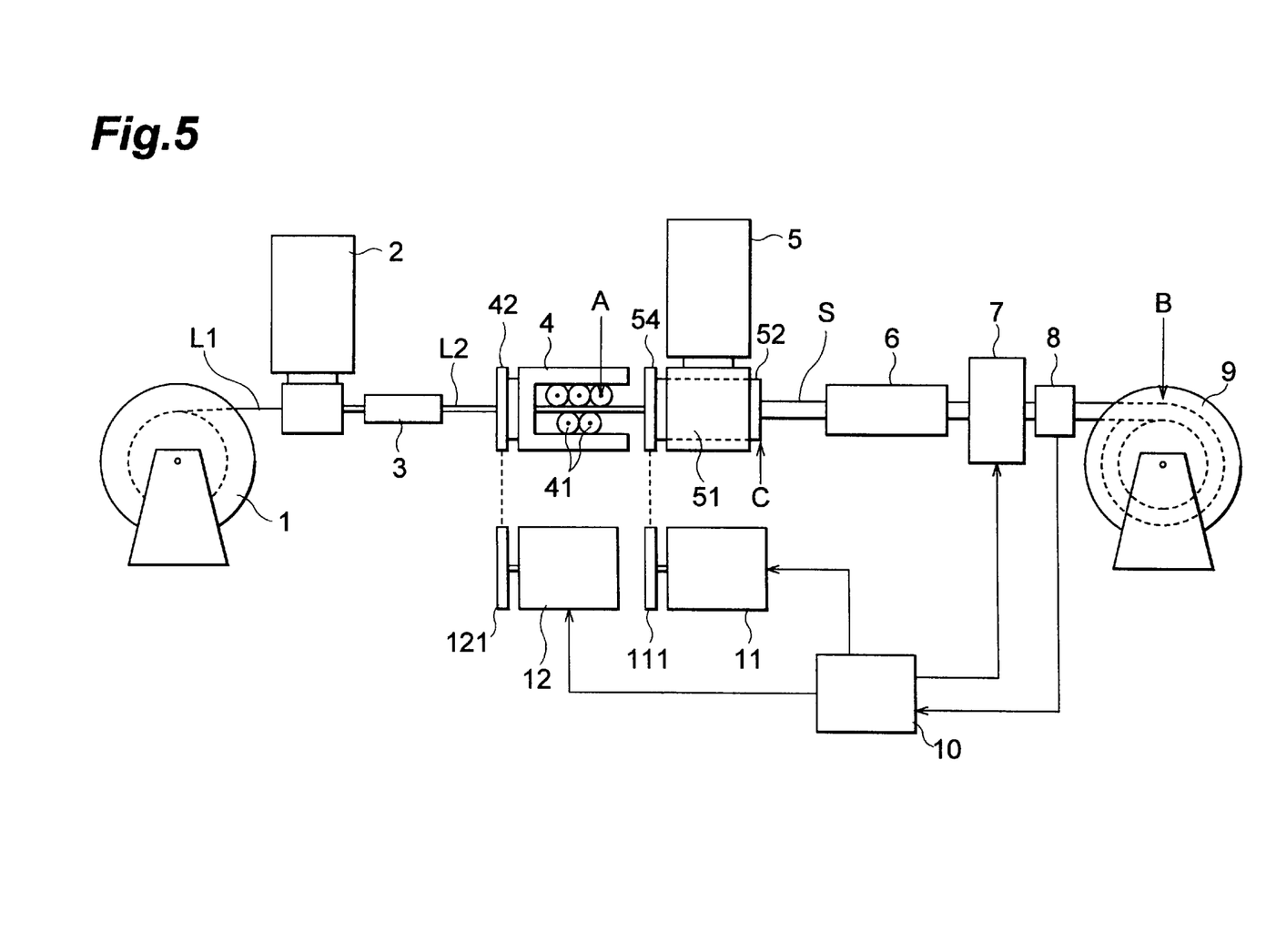
FIG. 5 is a block diagram showing a configuration according to an embodiment of the apparatus for making a slotted rod for an optical cable of the present invention.

As shown in FIG. 5, the apparatus according to this embodiment is configured such that a tension member L1 is supplied from the left side of the drawing and, as it travels rightward, through extruders 2, 5, and the like, a tension member L2 (the tension member L1 plus the primary coating) and a slotted rod are successively formed, before thus formed slotted rod is finally wound up. In conformity to the stages in accordance with this configuration, the individual parts will successively be explained from the upstream side.

Disposed on the most upstream side is a tension member supplier 1 wound with the tension member L1 made of a steel wire, which pays out the tension member L1 as being pulled with a predetermined tension. Also usable as the tension member L1 is a metal wire other than the above-mentioned steel wire, a strand steel wire, an FRP (Fiber Reinforced Plastic), or the like.

Subsequently disposed downstream the tension member supplier 1 is the extruder 2 for applying a resin as the primary coating around the tension member L1 being paid out. The tension member L1 is surrounded with the resin in the head portion of the extruder 2 and then is paid out to the next stage (as indicated by the primary-coated tension member L2 in the drawing). Here, the resin employed for the primary coating is placed between a resin used when forming slots G in a stage which will be explained later and the tension member L1, thereby functioning to enhance the adhesion therebetween. The resin primarily coated here also functions to improve the accuracy in size of the slotted rod S to be manufactured.

Disposed downstream the extruder 2 is a cooling bath 3, which is filled with cooling water. Since the coated resin has not completely been solidified yet, the tension member L2 cannot be grasped as it is with a grasping unit 4 disposed further downstream. Hence, the tension member 2 is passed through the cooling bath 3 so as to be solidified to such an extent that it can be grasped.

The grasping unit 4 is disposed downstream the cooling bath 3. The grasping mechanism 4 has a plurality of grasping pulleys (grasping rollers) 41 arranged opposite to each other, thereby the tension member L2 is held with the grasping pulleys 41 as being sandwiched therebetween. The outer peripheral face of each grasping pulley 41 is formed with a recessed groove extending in the circumferential direction in order for the tension member L2 to be grasped easily. Here, the contact face of the grasping pulley 41 may be provided with a rubber-like coating for preventing it from slipping against the tension member L2.

The grasping unit 4 as a whole, including the grasping pulleys 41, is configured so as to be rotatable about the tension member L2 inserted therein as its axis. The grasping unit 4 has a pulley 42 which receives a driving force from a first driving motor 12, and is driven alternately in reverse directions by the first driving motor 12. Employable as the first driving motor 12 are various kinds of motors such as AC servo motor whose amount of rotation, rotational direction, and rotational speed are controllable. The first driving motor 12 has a pulley 121 for transmitting a driving force to the grasping unit 4. The transmission of driving force may be effected by the pulleys 42 and 121 and a belt adjusted therebetween in the above-mentioned manner. Alternatively, gears may be disposed in place of the pulleys 42 and 121 and the belt, so as to transmit the driving force.

Figures 6A, 6B:
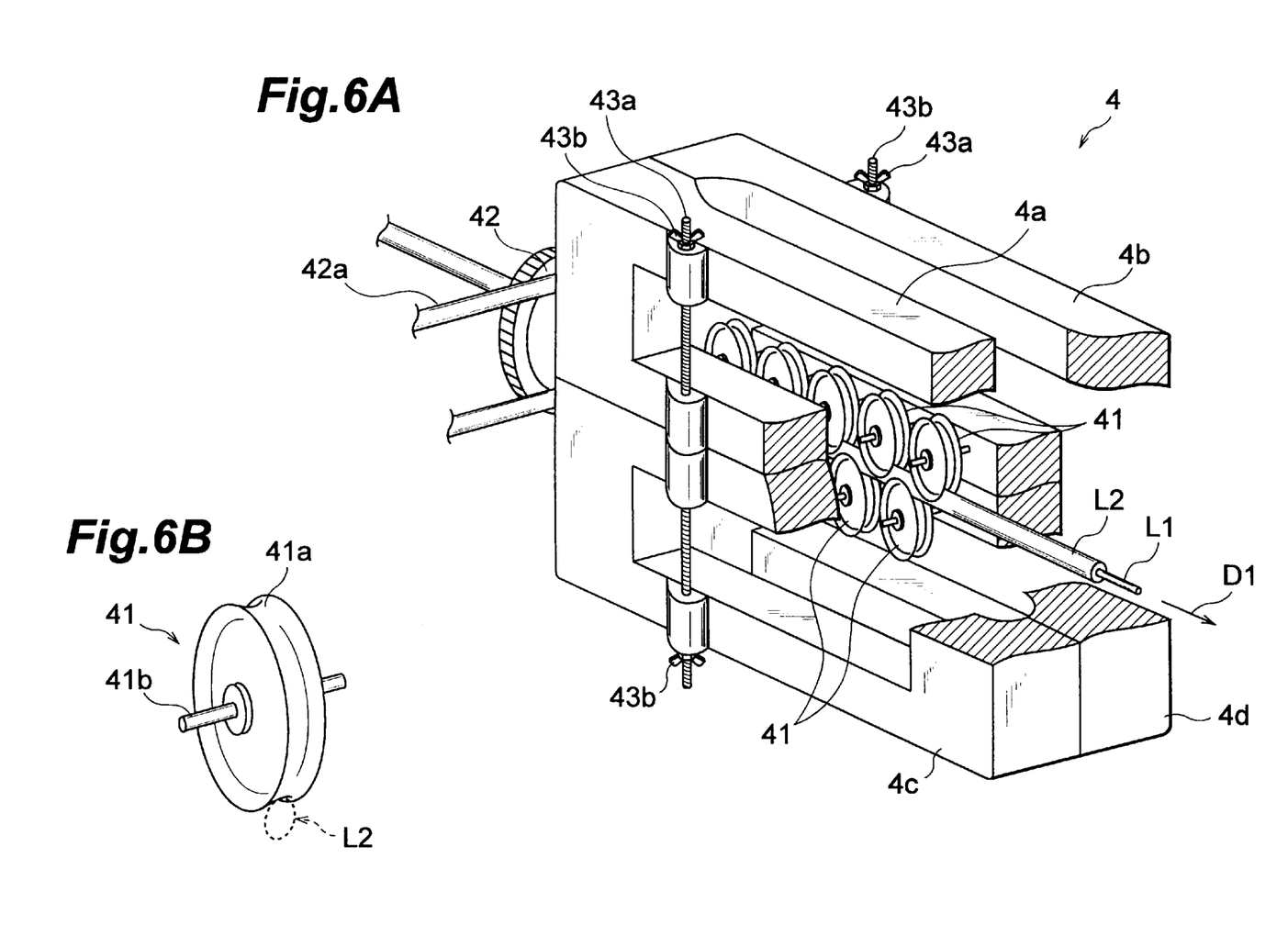

FIG. 6A is a partly fragmentary view showing a specific configuration of the grasping unit 4 shown in FIG. 5. The grasping unit 4 comprises a plurality of grasping pulleys 41, which are divided into first and second pulley groups disposed along the tension member L2 pulled (paid out) in the direction indicated by the arrow D1 in the drawing so as to sandwich the tension member L2 therebetween. Each grasping pulley 41 is rotatable about its axis of rotation 41b as shown in FIG. 6B, and is processed, in particular, such that its contact face 41a in contact with the tension member L2 matches the outer periphery of the tension member L2.

The first pulley group positioned on the upper side of the tension member L2 is supported as being sandwiched between members 4a and 4b, whereas the second pulley group positioned on the lower side of the tension member L2 is supported as being sandwiched between members 4c and 4d. The members 4a, 4b and members 4c, 4d are secured with bolts 43a and nuts 43b such as to grasp the tension member L2 from the upper and lower sides thereof. As a consequence of this configuration, the grasping unit 4 restrains the tension member L2 from being twisted and restrains the tension member L2 from positionally fluctuating in directions perpendicular to the pay-out direction D1 of the tension member L2. The pulley 42 of the grasping unit 4, which is joined to the pulley 121 of the first driving motor 12 via the belt 42a, is rotatable about the direction D1 when receiving the driving force of the first driving motor 12, thereby the tension member L2 is twisted in a predetermined direction.

As the grasping unit 4 rotates, the tension member L2 held with the grasping pulleys 41 is successively paid out into the extruder 5 while being twisted. Though the grasping pulleys 41 are not driven to rotate in this embodiment in order to reduce the inertia of the grasping member 4 as a rotating member, the grasping pulleys 41 may also be driven to rotate so as to positively pay out the tension member L2. Also, a belt capstan or the like may be used in place of the grasping pulleys 41.

The extruder 5 disposed downstream the grasping unit 4 is used for making a conventional slotted rod, having slots formed on its outer peripheral face, for an optical cable.

Figures 7A, 7B:
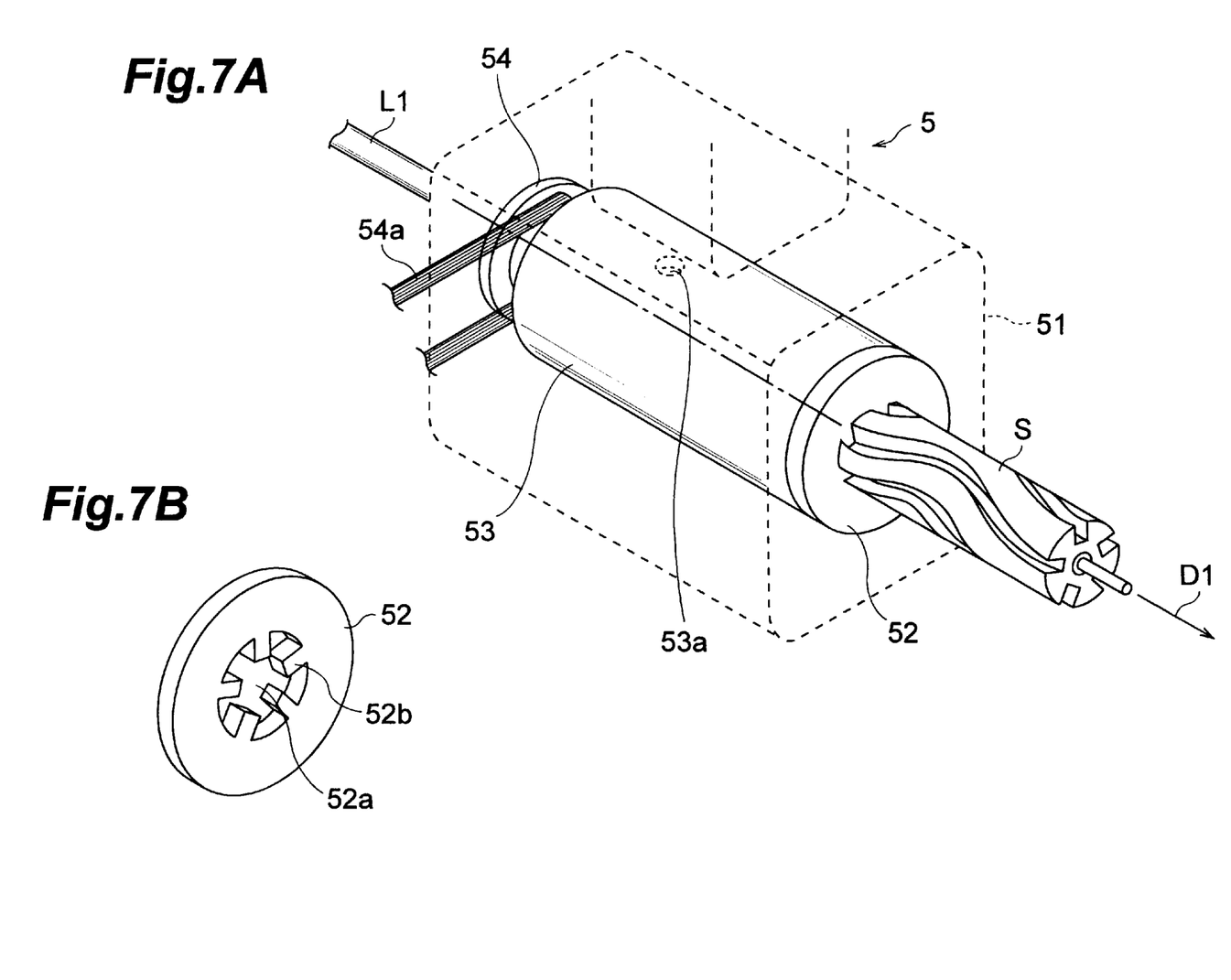
FIGS. 7A and 7B are views showing, respectively, the inner configuration of the extruder 5 shown in FIG. 5 and the configuration of the rotatable die.

FIG. 7A is a view showing an inner configuration of the extruder 5 shown in FIG. 5. In FIG. 7A, the molten resin is introduced into the head portion 51 through a hole 53a. In the head portion 51, a pulley 54 is disposed at an opening portion into which the tension member L2 with the primary resin layer is introduced, and a hollow pipe 53 having a rotatable die 52 disposed at the resin extruding orifice is placed. Formed at a side face of the pipe 53 is a through hole 53a, through which the molten resin is introduced into the pipe 53 that is rotated by the driving force transmitted through a belt 54a is extruded therefrom through the opening of the rotatable die 52 to the outside. FIG. 7B is a perspective view showing a configuration of the rotatable die 52. Here, the rotatable die 52 has an opening 52a for extruding the resin, and a plurality of protrusions 52b for forming slots G in the surface of the slotted rod S being extruded.

Namely, the extruder 5 has, its front end, the head portion 51 for extruding the resin in the state where it surrounds the tension member L2 inserted therein. Disposed at the resin extruding orifice of the head portion 51 is the rotatable die 52 having an opening shaped substantially identical to the cross section of the slotted rod S being produced. At the center of this opening, the tension member L2 is inserted. The rotatable die 52 is rotatable about the tension member L2 inserted therein as its axis.

The pipe 53 having the rotatable die 52 attached to its front end is joined to the pulley 54 that receives the driving force from a second driving motor 11 via the belt 54a, and is driven by the second driving motor 11 to rotate alternately in reverse directions. As with the above-mentioned first driving motor 12, various kinds of motors can be employed for the second driving motor 11. The second driving motor 11 also has a pulley 111 for transmitting a driving force toward the rotatable die 52. As with the above-mentioned first driving motor 12 and grasping unit 4, gears may be disposed in place of the pulleys 54 and 111 and the belt 54a, so as to transmit the driving force.

Figure 8A:
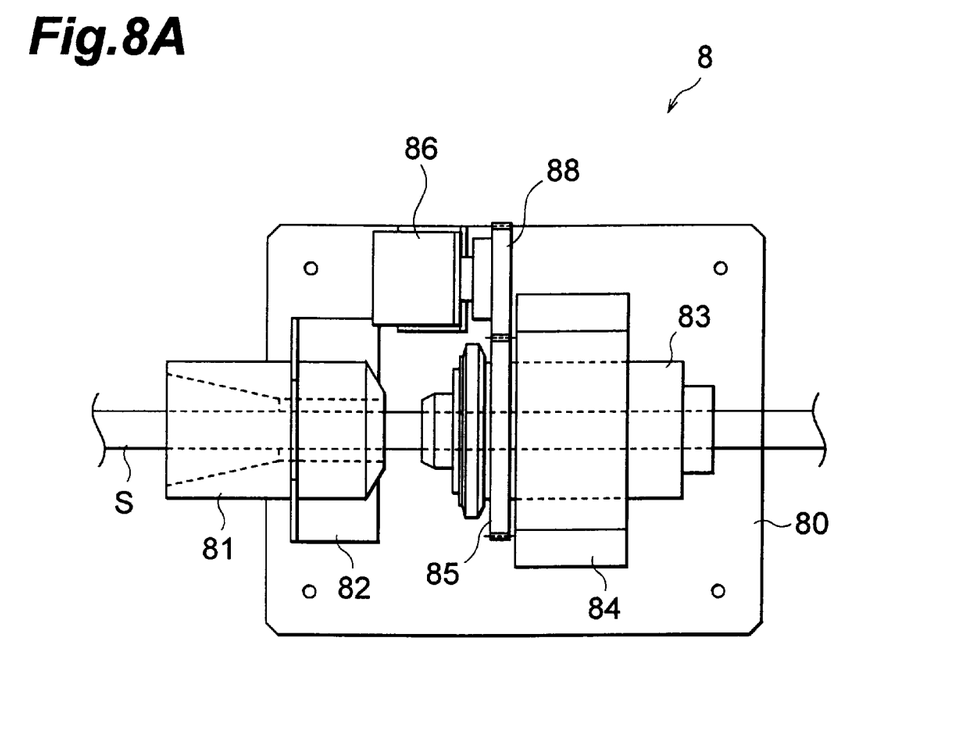
FIGS. 8A and 8B are views showing the configuration of the angle measuring apparatus 8 shown in FIG. 5, respectively illustrating a plan view and a lateral sectional view.
Figure 8B:
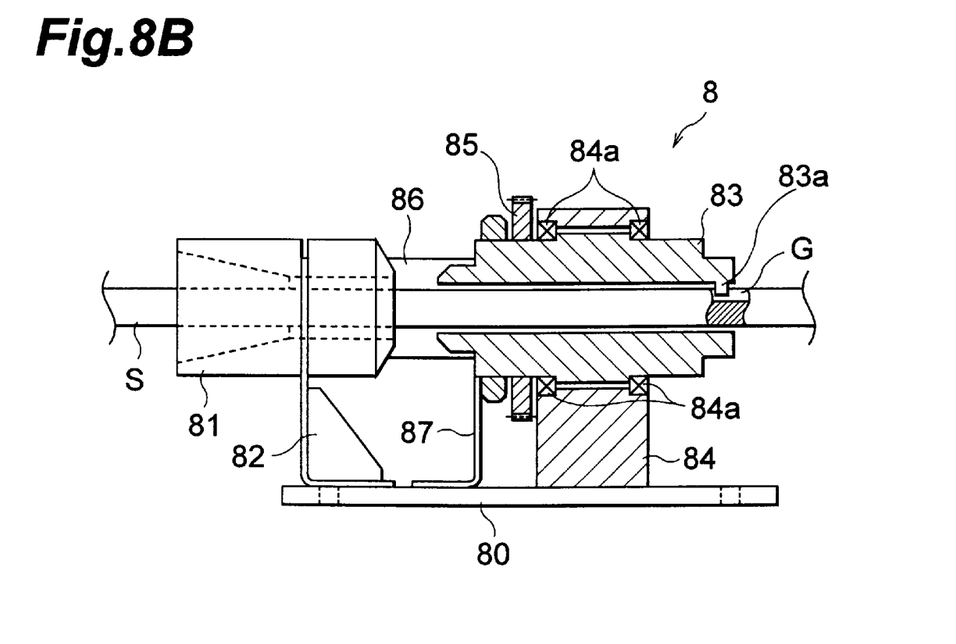

Downstream the extruder 5, a cooling bath 6 is disposed. Placed downstream the cooling bath 6 is a capstan 7 for taking up the slotted rod S at a predetermined speed. Disposed downstream the capstan 7 is an angle measuring apparatus 8 for measuring the reversing angle of the slot G of the molded slotted rod S. As shown in FIGS. 8A and 8B, the angle measuring apparatus 8 is secured onto a base plate 80. In FIGS. 8A and 8B, the slotted rod S is paid out from the left side to the right side.

Onto the base plate 80, a guide cylinder 81 is secured by way of an angle member 82. The through hole of the guide cylinder 81 has a tapered opening tapering down along the advancing direction of the slotted rod S, thereby vibrations of the slotted rod S on the upstream side are absorbed by the tapered opening. Downstream the guide cylinder 81, a rotary cylinder 83 is rotatably attached onto the base plate 80 by way of a pedestal 84 and a bearing 84a. The rotary cylinder 83 is placed such that its axis and the axis of the guide cylinder 81 coincide with each other.

The through hole of the rotary cylinder 83 has an inside diameter substantially identical to or slightly greater than the outside diameter of the slotted rod S inserted therein. Formed at the inner face of the rotary cylinder 83 at the downstream end portion thereof is a pin 83a adapted to engage a slot G of the slotted rod S. Connected to the rotary cylinder 83 on the upstream side is a gear 85 whose center coincides with the axis of the rotary cylinder 83. Here, for making it easier to cope with differences in the outside diameter of the slotted rod S to be measured and the width of the slot G, the rotary cylinder 83 may have a telescopic structure comprising two cylinder bodies, such that it can correspond to various modes of slotted rods S, while rendering the inner cylindrical body replaceable.

Being laterally spaced from the guide cylinder 81 and the rotary cylinder 83, a rotary encoder 86 is secured onto the base plate 80 by way of an angle member 87. Joined to the detection axis of the rotary encoder 86 is a gear which meshes with the gear 85 of the rotary cylinder 83. Namely, the amount of rotation of the rotary cylinder 83 is detected by the rotary encoder 86 via the gears 85 and 88, and the reversing angle of the slot G in the slotted rod S is obtained from thus detected amount of rotation. Here, various kinds of sensors adapted to measure the amount of rotation can be used in place of the rotary encoder 86 as well.

Disposed downstream the angle measuring apparatus 8 is a take-up unit 9, which sequentially takes up the produced slotted rod S. Also, the angle measuring apparatus 8 is electrically connected to a controller 10, which is connected to the above-mentioned first driving motor 12 and second driving motor 11. The controller 10 controls the first driving motor 12 and the second driving motor 11 on the basis of the reversing angle of the slot G measured by the angle measuring apparatus 8.

In particular, if the reversing angle of the slot G detected by the angle measuring apparatus 8 is greater than a desired reversing angle, the first driving motor 12 and/or second driving motor 11 will be controlled so as to reduce the rotational angle of the rotatable die 52 and/or the rotational angle of the grasping unit 4 such that the reversing angle of the slot G is lowered to the desired reversing angle. By contrast, if the reversing angle of the slot G detected by the angle measuring apparatus 8 is smaller than the desired reversing angle, the first driving motor 12 and/or second driving motor 11 will be controlled so as to increase the rotational angle of the rotatable die 52 and/or the rotational angle of the grasping unit 4 such that the reversing angle of the slot G is enhanced to the desired reversing angle.

The generation of control signals fed from the controller 10 to the first driving motor 12 and/or second driving motor 11 will now be explained with reference to FIG. 9. Since the rotation of the rotatable die 52 and the rotation of the grasping unit 4 are in synchronization with each other, they actually differ from each other only in their rotational angle and rotational direction. Namely, as indicated by S100 in FIG. 9, a control signal can be expressed in terms of time t on the abscissa and the rotational angle θ of the rotatable die 52 or grasping unit 4 (in which the maximum width of the rotational angle becomes the reversing angle) on the ordinate. Here, S110 and S120 represent the control signals fed to the second driving motor 11 and first driving motor 12, respectively. These control signals S110 and S120 differ from each other only in their magnification in the ordinate direction (maximum rotational angle). (Their phases will change when multiplied by −1.) In other words, if one control signal can coincide with the other control signal when the magnitude in the ordinate direction is changed (or without needing such a change) as shown in FIG. 9, it can be considered that they are in synchronization with each other.

Figure 9:
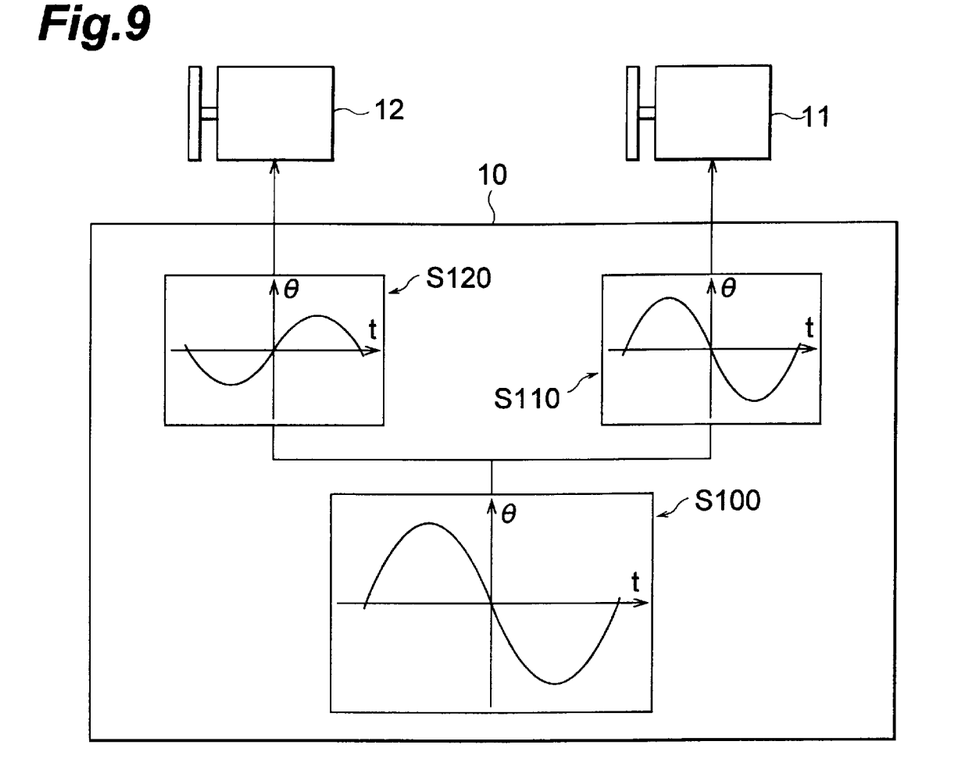
FIG. 9 is a view for explaining control signals fed to the motors 11 and 12 shown in FIG. 5.

For example, as shown in FIG. 9, the controller 10 generates the control signal S100 (where the abscissa and ordinate represent time t and rotational angle θ, respectively) and employs it, as it is, for the control signal S110 fed to the second driving motor 11 (generates it as a control signal for the second driving motor 11). For generating the control signal S120 fed to the first driving motor 12, the magnitude of the ordinate component θ in the control signal S100 is converted, while the phase thereof is reversed. As a consequence, from the control signal for one driving motor, the control signal for the other driving motor can easily be generated.

Alternatively, a reference signal having a constant waveform may be generated, the magnitude of the ordinate component in the reference signal may be changed to generate the control signal for the second driving motor 11, and the magnitude of the ordinate component in the reference signal may be converted (such that the phase thereof is always reversed), thus generating the individual control signals. Also, when subjecting the first driving motor 12 and/or second driving motor 11 to a feedback control on the basis of the actual reversing angle of the slotted rod S detected by the angle measuring apparatus 8, the magnification of the ordinate component in each control signal fed thereto would be adjusted.

Figure 10:
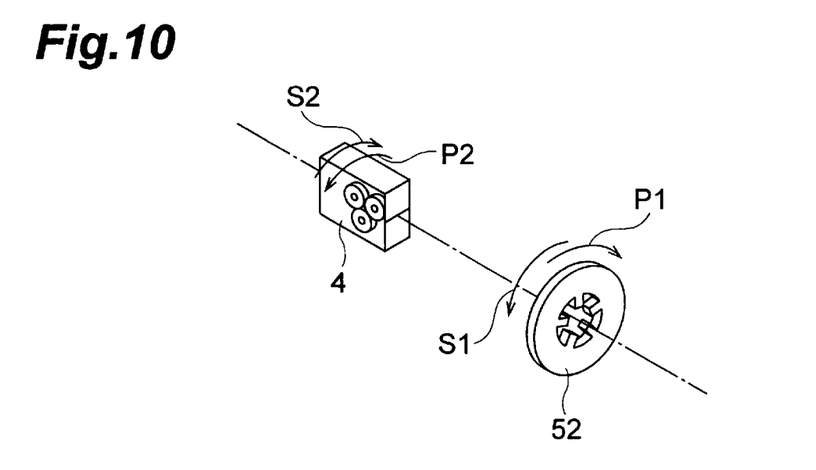
FIG. 10 is a conceptual view for explaining the rotating operations of the rotatable die 52 and grasping unit 4 on the basis of the control signals shown in FIG. 9.

As thus generated control signals S110 and S120 having phases different from each other are supplied to the driving motors 11 and 12, respectively, the rotatable die 52 and the grasping unit 4 rotate, in synchronization with each other, in reverse directions as shown in FIG. 10. Namely, while the rotatable die 52 is rotating in the direction indicated by the arrow S1, the grasping unit 4 rotates in the direction indicated by the arrow S2. By contrast, while the rotatable die 52 is rotating in the direction indicated by the arrow P1, the grasping unit 4 rotates in the direction indicated by the arrow P2.

An embodiment of the method of making a slotted rod for an optical cable using the above-mentioned manufacturing apparatus will now be explained.

As shown in FIG. 5, the tension member L1 is supplied from the tension member supplier 1 to the extruder 2. The tension member L1 supplied to the extruder 2 is coated with a resin as a primary coating in the head portion 51 thereof. Thus obtained tension member L2 is fed to the cooling bath 3. In the cooling bath 3, the tension member L2 is passed through cooling water, thereby the resin coated around the tension member L1 is solidified. The tension member L2 whose surroundings are solidified is supplied to the grasping unit 4, from which it is paid out to the extruder 5 positioned downstream thereof, while being grasped with the grasping pulleys 41.

The grasping unit 4 as a whole is rotated alternately in reverse directions by the first driving motor 12 that is driven and controlled by the control signal from the controller 10. Though the rotation of the grasping unit 4 is of course in synchronization with the rotation of the rotatable die 52 explained later, their rotational directions are opposite to each other. Here, in the state being grasped with the grasping pulleys 41, the tension member L2 is twisted so as to follow the rotation of the grasping unit 4.

The extruder 5 is disposed downstream of the grasping unit 4, which twists the tension member L2 alternately in reverse directions while it is supplied into the head portion 51 of the extruder 5. The tension member L2 penetrates through the head portion 51, and as the resin is extruded from the head portion 51 in the state surrounding the tension member L2, the slotted rod S is extrusion-molded. On the other hand, disposed at the resin extruding orifice of the head portion 51 is the rotatable die 52, which forms the slotted rod S having the slots G on its outer peripheral face of the slotted rod S. The rotatable die 52 rotates, in synchronization with the rotation of the grasping unit 4, in the direction opposite to the rotational direction of the grasping unit 4.

The rotational angles of the rotatable die 52 and grasping unit 4 will now be explained. In the above-mentioned apparatus, the rotational angle of the grasping unit 4 is set such that the rotational angle of the rotatable die 52 and the reversing angle of each slot G in the resulting slotted rod S equal each other. When set as such, substantially no twist would occur in the slotted rod S being extruded at the head portion 51, thereby the slotted rod S can be manufactured under a stable manufacture condition.

Alternatively, setting the rotational angle of the grasping unit 4 greater than the rotational angle of the rotatable die 52 is effective in attaining a higher linear speed. In this case, the rotational angle of the rotatable die 52 having a large inertia is made small so as to improve its high-speed trackability, thereby correspondingly increasing the rotational angle of the grasping unit 4 having a small inertia that can sufficiently follow the higher linear speed even when the slot reversing angle is enhanced. Also, the shearing stress applied to the resin can be alleviated within the head portion 51, thereby the surface of the resulting slotted rod S can become smoother.

Subsequently, the slotted rod S formed with the slots G therearound is cooled and solidified in the cooling bath 6. on the sufficiently cooled and solidified downstream side, the tension member L1/tension member L2/slotted rod S obtained through the above-mentioned stages is taken up by the take-up unit 7 rightward in the drawing. Further, the resulting slotted rod S is paid out into the angle measuring apparatus 8 positioned downstream.

The angle measuring apparatus 8 detects the actual reversing angle of the slotted rod S, and feeds the result of this detection (electric signal) to the controller 10. Then, the slotted rod S is taken up by the take-up unit 9 positioned downstream the angle measuring apparatus 8. The actual reversing angle of a slot G fed to the controller 10 is compared with the preset value of the reversing angle of the slot G, and if it exceeds a permissible range, the control signal S110, S120 fed from the controller 10 to the first driving motor 12 and/or second driving motor 11 is adjusted, thereby a feedback control is effected such that the actual reversing angle of the slot G falls within the permissible range.

In the case where the slotted rod S is manufactured by the above-mentioned apparatus and method, when the grasping unit 4 is rotated in a direction opposite to that of the rotatable die 52, the rotational angle of the rotatable die 52 can be made small, thus allowing the manufacturing efficiency to improve due to the higher linear speed. Also, the driving section of the rotatable die 52 can have a smaller capacity, thereby the manufacturing apparatus can be made smaller and less expensive.

The mechanism for rotating the grasping unit 4 alternately in directions different from each other can have a configuration simpler and lighter than that of the mechanism for rotating the rotatable die 52 in reverse directions. As a consequence, high-speed reversal can easily be realized. Also, since the rotational angle of the rotatable die 52 and/or the rotational angle of the grasping unit 4 is adjusted according to the actual reversing angle of the slot G measured by the angle measuring apparatus 8, the accuracy in reversing angle of the slot G of the resulting slotted rod can further be improved, while labor and resources are saved thereby.

Figure 11:
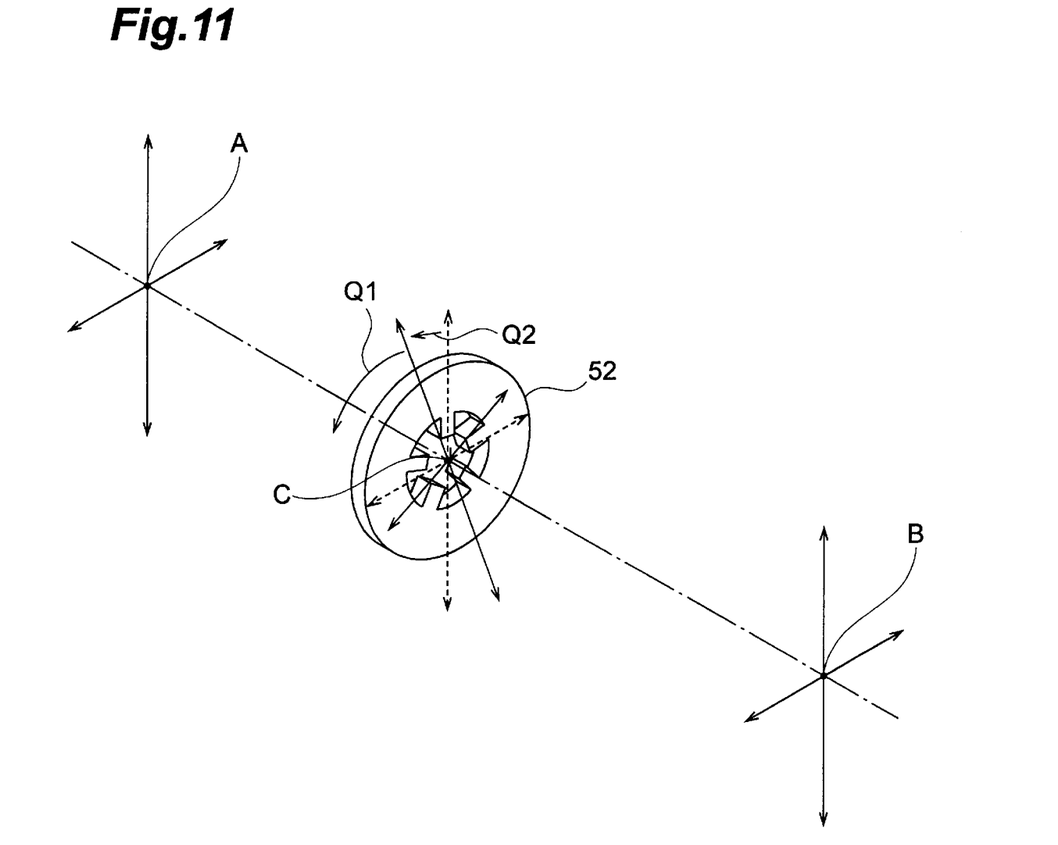
FIG. 11 is a conceptual view for explaining the problems of a conventional manufacturing apparatus and the principle of the present invention.

The difference between the rotational angle of the rotatable die 52 and the reversing angle of the slot G is generated by an effect such as that shown in FIG. 11. Namely, even in the case where the reference coordinates of the tension member L2 at the position of the pulley closest to the extruder 5 in the grasping unit 4 in FIG. 5 (position indicated by A in FIG. 5) and the reference coordinates of the tension member in the slotted rod S at the position where the produced slotted rod S is wound up (position indicated by B in FIG. 5) coincide with each other, when the rotatable die 52 rotates in the direction indicated by the arrow Q1 in the drawing, for example, the reference coordinates of the tension member at the position of the rotatable die 52 (position indicated by c in FIG. 5) would rotate in the direction of the arrow Q2.

Hence, in the manufacturing apparatus disclosed in Japanese Patent Application Laid-Open No. 3-110509, since a twist would occur between the grasping unit for the tension member and the rotatable die even when the tension member is restrained from twisting at the point A, the rotational angle of the rotatable die must still be made greater than the reversing angle of the slot even when the rotational angle of the rotatable die can be reduced to a certain extent. On the other hand, the manufacturing apparatus disclosed in Japanese Patent Application Laid-Open No. 1-303408 is aimed at reducing the twisting force applied to the slotted rod during the manufacture, thereby it does not reduce the rotational angle of the rotatable die, thus still failing to improve the manufacturing efficiency.

In the present invention, by contrast, as the tension member L2 is twisted to a direction opposite to the rotational direction of the rotatable die 52, the reference coordinates rotating together with the rotatable die 52 can be returned to the original state (coordinates indicated by the broken lines in the drawing). As a consequence, the reversing angle of the slot G formed in the surface of the slotted rod S can correctly be controlled. Further, if the tension member L2 is twisted at least to such an extent as to return the reference coordinates to their original state, a slot having a desired reversing angle can be formed even when the rotational angle of the rotatable die 52 is made smaller.

Figure 12:
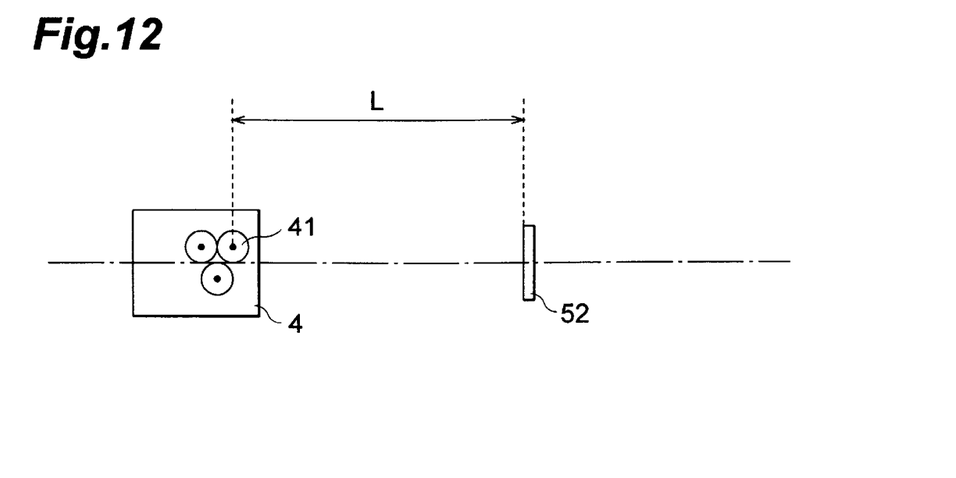
FIG. 12 is a view for explaining the positions where the grasping unit 4 and rotatable die 52 are placed.

Here, for effectively applying a twist to the tension member L2, it is preferred that the grasping unit 4 be disposed as closest to the rotatable die as practically possible at a position which is upstream of the head portion. Here, as shown in FIG. 12, this distance L is defined by the distance between the inner side face of the rotatable die 52 and the center of the pulley positioned closest to the rotatable die 52 in the grasping unit 4 (or the point of contact between this pulley and the tension member L2).

For verifying that the rotational angle of the rotatable die 52 could be reduced, a slotted rod was actually manufactured by the above-mentioned method and apparatus. A stranded steel wire in which seven steel wires each having a diameter of 1.4 mm were stranded was used as a tension member L1, and a resin was extruded therearound, thus yielding a tension member L2 having a diameter of 8 mm. Subsequently, in the state where the tension member L2 was surrounded by a resin being extruded, four slots G were formed, thereby a slotted rod S having a diameter of 15.5 mm was obtained. The position for grasping the tension member L2 in the grasping unit 4 was located 600-mm upstream the rotatable die 52. With the reversing pitch P for reversing the rotational direction of the rotatable die 52 being set to 470 mm, the rotatable die 52 was rotated alternately in reverse directions at a rotational angle of 360°, while the grasping unit 4 was rotated at a rotational angle of 120° in the direction opposite to the rotational direction of the rotatable die 52, thereby the reversing angle of each slot G in the actually produced slotted rod S became 361°, thus making the rotational angle of the rotatable die 52 and the reversing angle of the slot G substantially equal each other.

On the other hand, a slotted rod S was made under the same condition as that mentioned above except that the rotating operation in the grasping unit 4 was stopped so as not to apply a twist to the tension member L2 in the opposite direction. In this case, the reversing angle of the slot G in the actually made slotted rod S was 275°, which was smaller than the rotational angle of the rotatable die 52. Thus, in accordance with the method and apparatus of the present invention, the rotational angle of the rotatable die 52 can be made small. Also, under the above-mentioned condition, when the rotational angle of the rotatable die 52 was set to 120°, and the rotational angle of the grasping unit 4 (rotated in the direction opposite to the rotatable die 52) was set to 240°, the reversing angle of the slot G in the actually produced slotted rod S became 262°, thereby it was confirmed that the rotational angle of the rotatable die 52 could be made smaller than the reversing angle of the slot G.

Figure 13:
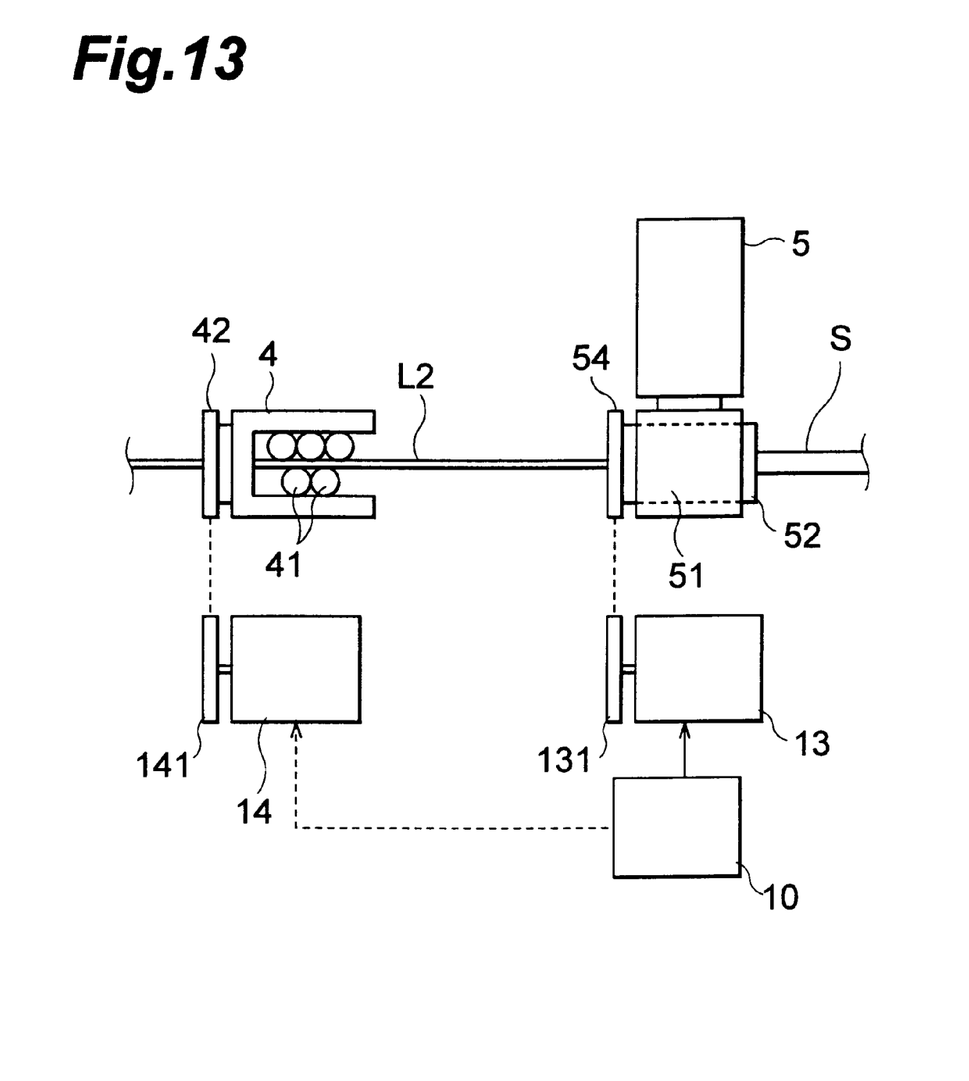
FIG. 13 is a block diagram partly showing the structure of another embodiment of the apparatus for manufacturing a slotted rod for an optical cable according to the present invention.

FIG. 13 shows another embodiment of the apparatus for making a slotted rod for an optical cable according to the present invention. Since this apparatus has a configuration substantially the same as that of the above-mentioned apparatus shown in FIG. 5, the structures different from those in the apparatus shown in FIG. 5 will be explained in detail, without describing the structures identical or equivalent to those in the apparatus shown in FIG. 5.

In the apparatus according to this another embodiment, a single driving motor 13 is provided in order to rotate each of the rotatable die 52 and the grasping unit 4 alternately in reverse directions. Also, a transmission mechanism 14 is disposed between the driving motor 13 and the grasping unit 4. The driving motor 13 has a pulley 131 for transmitting a driving force toward the rotatable die 52, whereas the transmission mechanism 14 has a pulley 141 for transmitting the driving force from the driving motor 13 to the grasping unit 4. In this apparatus, the rotations of the rotatable die 52 and the grasping unit 4 in the reverse directions can completely be synchronized with each other since they are physically connected to the single driving motor 13. Here, the rotation of the rotatable die 52 and the rotation of the grasping unit 4 are different from each other only in their rotational angle and rotational direction, thereby the driving force from the single driving motor 13 can easily be converted by the transmission mechanism 14. Also, contrary to the apparatus shown in FIG. 13, the grasping unit 4 may directly be driven by a single motor, while allowing the rotatable die 52 to be driven by way of a transmission mechanism.

Though the above-mentioned embodiments employ, as the tension member L2, the one in which the tension member L1 made of a steel wire or the like is surrounded by a resin as a primary coating aimed at improving adhesion, a steel wire or the like may also be used as a tension member as it is. Also, in the extruder 5, an extrusion-molding operation for applying a resin aimed at improving adhesion to the tension member L1 and an extrusion-molding operation for forming the slots G can be performed at substantially the same time.

As explained in the foregoing, in the method of making a slotted rod for an optical cable according to the present invention, provided upstream a rotatable die is a grasping unit which can rotate alternately in reverse directions about a tension member as its axis of rotation in the state where the tension member is grasped, and the grasping unit is rotated, in synchronization with the rotation of the rotatable die, in a direction opposite to the direction in which the rotatable die rotates, thereby the rotational angle of the rotatable die can be made small. As a consequence, manufacturing efficiency can be improved while alleviating the load applied to the manufacturing apparatus.

The apparatus for making a slotted rod for an optical cable according to the present invention comprises an extruder for extruding a resin in the state surrounding a tension member which is linearly being paid out; a rotatable die disposed at a head portion of the extruder and adapted to rotate alternately in directions opposite to each other about the tension member as its axis of rotation; and a grasping unit disposed upstream the rotatable die and adapted to rotate, in synchronization with the rotation of the rotatable die, in a direction opposite to the direction in which the rotatable die rotates, while grasping the tension member being paid out; thereby the rotational angle of the rotatable die can be made small, thus allowing manufacturing efficiency to improve while alleviating the load applied to the head portion.

From the invention thus described, it will be obvious that the embodiments may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making a slotted rod for an optical cable, said method comprising the steps of:

introducing into an extruder a tension member, said extruder having a head portion with a space into which a molten resin is injected in a state where said tension member penetrates therethrough, and providing a rotatable die at a resin extruding orifice of said head portion; and rotating said rotatable die, during when the resin covering said tension member is being extruded from said head portion, about a moving direction of said tension member such that said die alternately reverses the rotational direction thereof for every predetermined reversing pitch of said tension member and twisting said tension member alternately in rotational directions opposite to the rotational directions of said rotatable die in synchronization with the rotation of said rotatable die.

2. A method according to claim 1, wherein said tension member is twisted in a direction opposite to the rotational direction of said rotatable die to such an extent that a reversing angle of a slot, defined by a deviation between the positions of the slot formed at a reversion of the rotational direction of said rotatable die and the slot formed at the next reversion of said rotational direction, coincides with the rotational angle of said rotatable die, to thereby minimize the twist generated in the tension member.

3. A method according to claim 1, wherein a twist angle for said tension member is greater than the rotational angle of said rotatable die.

* * * * *